United States Patent [19]

Bannister

[11] Patent Number: 4,471,037

[45] Date of Patent: Sep. 11, 1984

[54] SOLID STATE ELECTROCHEMICAL CELL

[75] Inventor: Dennis J. Bannister, Wakefield, England

[73] Assignee: United Kingdom Atomic Energy Authority, England

[21] Appl. No.: 482,164

[22] Filed: Apr. 5, 1983

[30] Foreign Application Priority Data

Apr. 16, 1982 [GB] United Kingdom ............... 8211146

[51] Int. Cl.$^3$ .............................................. H01M 6/18
[52] U.S. Cl. ................................... 429/191; 429/192
[58] Field of Search ............... 429/191, 192, 30, 33, 429/218; 252/62.2

[56] References Cited

U.S. PATENT DOCUMENTS 3,551,211 12/1970 Grulke ............................ 429/192
4,200,701 4/1980 Wetton ......................... 252/62.6 X
4,321,314 3/1982 Bowden et al. ................ 429/197 X
4,329,404 5/1982 Bowden et al. ................ 429/101 X

*Primary Examiner*—Anthony Skapars
*Attorney, Agent, or Firm*—Larson and Taylor

[57] ABSTRACT

A solid state electrochemical cell comprises an anode having Li as its active material, a cathode and an electrolyte comprising a complex of a polyether with lithium.

The polyether is atactic, has a low glass transition temperature and is capable of forming a complex with Li$^+$ ions but not with Na$^+$ ions. An example of such a polyether is polyvinyl methyl ether. The complex may be blended with another polymer such as a poly (ethylene oxide) - LiClO$_4$ complex to improve mechanical properties for fabrication into the electrolyte.

5 Claims, No Drawings

SOLID STATE ELECTROCHEMICAL CELL

The invention relates to an electrochemical cell incorporating a solid electrolyte; the electrolyte comprises a complex of a polyether with lithium.

Complexes of poly(ethylene oxide) and a lithium salt have been studied and observed to have high ionic conductivities. See, for example, a paper by M. D. Armand et al presented to the 2nd International Conference on Solid Electrolytes at St. Andrews' University, UK in 1978. There is, however, interest in improving the performance of Li polymer complexes for their use as electrolytes in solid state electrochemical cells.

The invention provides a solid state electrochemical cell comprising an anode having lithium as its active material, a cathode and an electrolyte comprising a complex of a polyether with lithium, the polyether being an atactic polyether having a glass transition temperature of substantially less than 0° C. and being capable of forming a complex with Li+ ions but not with Na+ ions.

The electrolytes of the invention have been found, in certain test experiments described herein, to have higher ionic conductivities than certain known Li polymer complexes. This is believed to be due to the polyethers of the invention, being atactic, i.e., having no stereo regularity, having an enhanced proportion of amorphous regions. Thus, it is believed that high ionic conductivity may occur via such amorphous regions. Moreover, because the polyether of the invention are not capable of forming complexes with Na+, it is believed that the Li+ ions in the electrolyte will be more loosely bound to the polyether than say in the case of poly(ethylene oxide), which does form complexes with Na+, thereby giving rise to higher lithium ion conductivity.

An example of a polyether useful in the invention is polyvinyl methyl ether, referred to hereinafter as PVME, which has a low glass transition temperature (−30° C.) and is an atactic material with amorphous characteristics. Moreover, PVME is capable of forming complexes with Li salts such as $LiClO_4$, e.g. by simple addition thereof, but not with Na salts such as NaSCN.

Polyethers useful in the invention may not necessarily be mechanically suitable in themselves for fabrication into electrolytes suitable for use in electrochemical cells. It may, therefore, be necessary to blend such a polyether with another material to produce appropriate mechanical properties for the above purposes. For example, PVME may be in the form of a viscous liquid at room temperature and may therefore have to be blended with another polymer such as a saturated poly(ethylene oxide)-$LiClO_4$ complex.

Electrochemical cells of the invention may be made by methods known in the art and the electrodes may be constituted by materials known in the art. For example, the anode may be made of Li or of an alloy thereof and the cathode of an intercalation compound such as $TiS_2$.

Several ways of carrying out the invention will be described in detail below by way of example only.

EXAMPLE 1

(i) Preparation of electrolyte

A complex of PVME, $LiClO_4$ and poly(ethylene oxide) was prepared by addition of the above constituents in methanolic solution. The methanol was then removed under vacuum at 100° C. The resulting electrolyte had a ratio of O atoms in the poly(ethylene oxide) to Li+ ions of 3.9 and had 10% by weight of the PVME in relation to the poly(ethylene oxide).

(ii) Properties of Electrolyte

The specific ionic conductivity of the electrolyte was measured and found to be ca. $1 \times 10^{-4} \Omega^{-1} cm^{-1}$ at 93° C. This compares with a value of ca. $6 \times 10^{-5} \Omega^{-1} cm^{-1}$ for a known poly(ethylene oxide)-LiSCN complex having a O/Li+ ratio of 5.0 and a value of ca. $6 \times 10^{-5} \Omega^{-1} cm^{-1}$ for a known poly(ethylene oxide)-$LiBF_4$ complex with a O/Li+ ratio of 4.0.

EXAMPLE 2

The procedure of step (i) of Example 1 was repeated except that the electrolyte produced had 50% by weight of PVME in relation to poly(ethylene oxide) and an O/Li+ ratio of 3.8. The specific ionic conductivity was found to be ca. $10^{-6} \Omega^{-1} cm^{-1}$ at 25° C. This is an order of magnitude higher than the value found for a known poly(ethylene oxide)-$LiClO_4$ complex having a O/Li+ ratio of 4.5.

I claim:

1. A solid state electrochemical cell comprising an anode having lithium as its active material, a cathode and an electrolyte comprising a complex of a polyether with lithium, the polyether being an atactic polyether having a glass transition temperature of substantially less than 0° C. and being capable of forming a complex with Li+ ions but not with Na+ ions.

2. A solid state electrochemical cell as claimed in claim 1 wherein the polyether is polyvinyl methyl ether.

3. A solid state electrochemical cell as claimed in claim 1 wherein the polyether is blended with another polymer for improving the mechanical properties of the polyether.

4. A solid state electrochemical cell as claimed in claim 3 wherein the other polymer is poly(ethylene oxide).

5. A solid state electrochemical cell as claimed in claim 4 wherein the electrolyte comprises a complex of polyvinyl methyl ether with $LiClO_4$ blended with a complex of poly(ethylene oxide) with $LiClO_4$.

* * * * *